(12) United States Patent
Thanigasalam et al.

(10) Patent No.: US 10,691,629 B2
(45) Date of Patent: Jun. 23, 2020

(54) DEVICE, APPARATUS AND SYSTEM TO REDUCE CURRENT LEAKAGE DURING DIFFERENTIAL COMMUNICATIONS

(71) Applicant: INTEL CORPORATION, Santa Clara, CA (US)

(72) Inventors: Haran Thanigasalam, San Jose, CA (US); Steven Peterson, El Dorado Hills, CA (US)

(73) Assignee: INTEL CORPORATION, Santa Clara, CA (US)

( * ) Notice: Subject to any disclaimer, the term of this patent is extended or adjusted under 35 U.S.C. 154(b) by 93 days.

(21) Appl. No.: 15/572,483

(22) PCT Filed: May 24, 2016

(86) PCT No.: PCT/US2016/033975
§ 371 (c)(1),
(2) Date: Nov. 7, 2017

(87) PCT Pub. No.: WO2016/191437
PCT Pub. Date: Dec. 1, 2016

(65) Prior Publication Data
US 2018/0285301 A1    Oct. 4, 2018

Related U.S. Application Data

(60) Provisional application No. 62/166,623, filed on May 26, 2015.

(51) Int. Cl.
*G06F 13/40* (2006.01)
*H04L 25/02* (2006.01)
(Continued)

(52) U.S. Cl.
CPC ...... *G06F 13/4027* (2013.01); *G06F 13/4295* (2013.01); *H04L 25/0272* (2013.01);
(Continued)

(58) Field of Classification Search
CPC .. G06F 13/4027; G06F 13/4295; G06F 13/38; G06F 13/4004; G06F 13/4282;
(Continued)

(56) References Cited

U.S. PATENT DOCUMENTS 8,041,216 B2 * 10/2011 de Lind Van Wijngaarden .......... H04J 3/1694
398/63
9,094,246 B1 * 7/2015 Chi ...................... H04L 25/0292
(Continued)

OTHER PUBLICATIONS

Physical Layers: M-PHY (R), D-PHY, C-PHY; Sep. 16, 2014; mipi alliance; pp. 1-2 (Year: 2014).*
(Continued)

*Primary Examiner* — Idriss N Alrobaye
*Assistant Examiner* — Richard B Franklin
(74) *Attorney, Agent, or Firm* — Womble Bond Dickinson (US) LLP

(57) ABSTRACT

Techniques and mechanisms for communicating packets of image information, the packets each having a respective format that is defined or otherwise indicated by a camera serial interface standard. In an embodiment, circuitry of a first physical layer (PHY) is operated to facilitate such communication via a lane of an interconnect that is coupled between the first PHY and a second PHY. The PHYs further communicate between each other a packet delimiter sequence between two such packets. In another embodiment, the plurality of packets and the packet delimiter sequence are communicated after a transition of one PHY from a relatively low power state, and prior to any subsequent transition of that PHY back to the relatively low power state. The camera serial interface standard specifies or otherwise indicates a protocol whereby a transition to such a low power state is performed between the respective communications of any two successive packets.

15 Claims, 10 Drawing Sheets

(51) Int. Cl.
*G06F 13/42* (2006.01)
*H04N 5/232* (2006.01)

(52) U.S. Cl.
CPC ............ *H04N 5/232* (2013.01); *Y02D 10/14* (2018.01); *Y02D 10/151* (2018.01)

(58) Field of Classification Search
CPC .... H04L 25/0272; H04N 5/232; Y02D 10/14; Y02D 10/151
See application file for complete search history.

(56) References Cited

U.S. PATENT DOCUMENTS

| | | |
|---|---|---|
| 9,281,935 B2 * | 3/2016 | Lee ...................... H04L 7/0016 |
| 2009/0193109 A1 | 7/2009 | Kuo et al. |
| 2012/0269070 A1 | 10/2012 | Bobrek et al. |
| 2014/0281108 A1 | 9/2014 | Pethe et al. |
| 2015/0009095 A1 | 1/2015 | Dai et al. |
| 2015/0046731 A1 | 2/2015 | Hays |

OTHER PUBLICATIONS

PCT/US2016/033975 Notification of Transmittal of International Search Report and Written Opinion dated Dec. 7, 2017, 7 Pages.
International Search Report and Written Opinion received for PCT Patent Application No. PCT/US2016/033975, dated Aug. 8, 2016, 8 pages.
International Preliminary Report on Patentability received for PCT Patent Application No. dated Dec. 7, 2017, 7 pages.

* cited by examiner

DEVICE, APPARATUS AND SYSTEM TO REDUCE CURRENT LEAKAGE DURING DIFFERENTIAL COMMUNICATIONS

CROSS-REFERENCE TO RELATED APPLICATION

This patent application is a U.S. National Phase Application under 35 U.S.C. § 371 of International Application No. PCT/US2016/033975, filed May 24, 2016, entitled DEVICE, APPARATUS AND SYSTEM TO REDUCE CURRENT LEAKAGE DURING DIFFERENTIAL COMMUNICATIONS, which claims the benefit of U.S. Provisional Application No. 62/166,623 filed on May 26, 2015, the entire contents of which are hereby incorporated by reference herein.

BACKGROUND

1. Technical Field

Embodiments of the invention relate generally to signaling performed with physical layer circuitry and more particularly, but not exclusively, to an efficient protocol for communicating image information.

2. Background Art

Camera serial interface (CSI) standards, such as those defined in various specifications of the Mobile Industry Processor Interface (MIPI) Alliance, facilitate the communication of image information between respective physical layer logic of interconnected devices. The MIPI standard CSI-2 v1.1 can support 6 Gigabits per second (Gbps) communications over 10 high-speed pins of a physical layer (PHY) that is compatible with the MIPI differential PHY (D-PHY) standard v1.1. The MIPI standard CSI-2 v1.2 can support even higher rates of communications using up to 8 lanes of a PHY that is compatible with the MIPI D-PHY standard v1.2. The MIPI standard CSI-2 v1.3 is a superset of CSI-2 v1.2, and includes provisions to support the MIPI camera PHY (C-PHY) standard v1.0.

Current leakage, which can be attributable in part to the size of transistors and other integrated circuit components, is one limit on CSI-type (or other) interfaces providing power efficient, high bandwidth data communication. Some effects of current leakage include greater than expected power consumption, and diminished signal integrity. As successive generations of fabrication technology continue to scale the size of semiconductor devices, the effects of current leakage are expected to increasingly impact the data rates of such interfaces.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
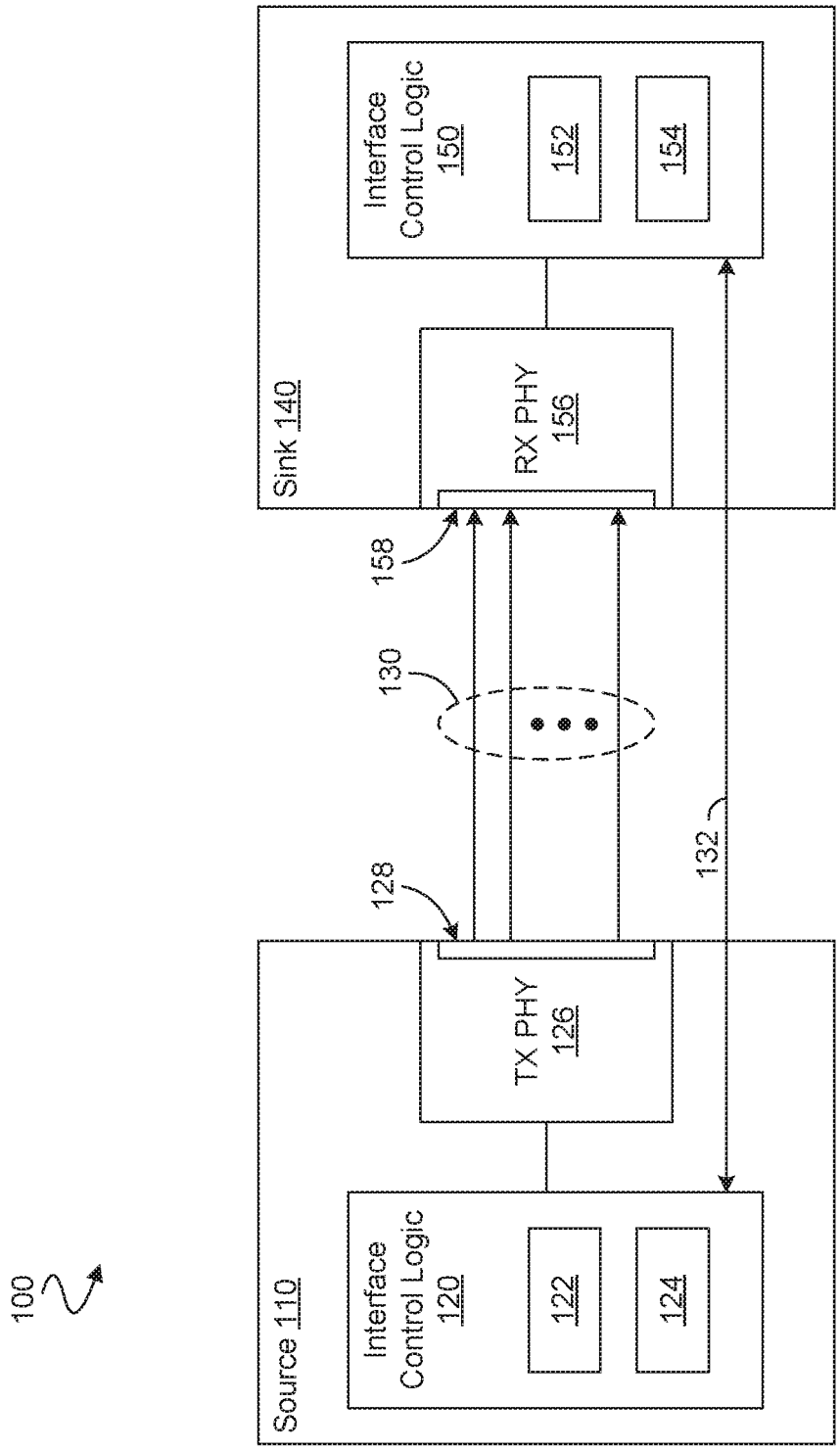
FIG. 1 is a high-level functional block diagram illustrating elements of a system to communicate image information according to an embodiment.

Embodiments discussed herein variously provide communications that, as compared to existing techniques, enable improved utilization of power resources and/or bandwidth. Communication techniques and mechanisms of some embodiments variously avoid certain transitions to relatively high voltage signaling, where such transitions might otherwise take place according to a PHY standard and/or a serial interface standard that references the PHY standard (e.g., while supporting most legacy mechanisms of the PHY standard and/or legacy mechanisms the interface standard). Avoiding such transitions may facilitate benefits such as reduced current leakage, improved power savings, high-voltage design costs savings and/or the like.

"CSI" (or alternatively, "CSI-2") refers herein to a camera serial interface standard such as that of the CSI-2 v1.0 specification of 2005 from the MIPI Alliance, CSI-2 v1.3 or any of a variety of other such specifications. A CSI interface may use a unidirectional high performance PHY to transfer pixel content and/or other image information from a sink device to a source device. The unidirectional high data bandwidth (throughput) bus may be based on a C-PHY standard or a D-PHY standard, such as one of variously specifications developed by the MIPI Alliance. In addition, the CSI interface may contain a bidirectional command channel called a camera command interface (CCI) that is used to configure an image sensor and/or to pass, for example, 3A (auto exposure, auto white balance, and auto focus) information on an as-needed basis. This bidirectional channel may be compatible with an I2C standard, or an I3C standard, for example.

Certain features of various embodiments are described herein with reference to signals communicated using an interface that operates with a PHY to communicate image information using some—but not all—signaling conventions (e.g., protocols, formats, timings, etc.) of a CSI-2 standard and/or a PHY standard. The PHY standard may be specified, for example, in a MIPI differential PHY (D-PHY) specification such as the D-PHY v1.2 specification of the MIPI Alliance. In other embodiments, the PHY standard may be specified in a MIPI camera PHY (C-PHY) specification such as the C-PHY specification released Sep. 17, 2014 by the MIPI Alliance. However, some embodiments may be extended to apply to any of a variety of other additional or alternative standards/specifications. For example, communications may use certain conventions of any of various other PHY specifications having packet format, LPS signaling, power state transition and/or other requirements, as variously described herein. In some embodiments, functionality—referred to herein as Latency Reduction Transport Efficiency (LRTE)—may be exploited to selectively enable and/or disable one or more packet protocol mechanisms (for example, in response to a communication via a Camera Control Interface (CCI) or in response to an image sensor driver). LRTE functionality to support relatively short packet delimiter sequences, such as that described herein, may be adapted into a future CSI-2.0 standard.

As used herein, "I2C/I3C" refers to compatibility with any of various I2C standards or any of various I3C standards. One example of an I2C standard is that of the I2C-bus specification Rev. 6 (4 Apr. 2014) from NXP Semiconductors, Eindhoven, Netherlands. One example of an I3C standard is that of the I3C specification ratified in September 2015 by the MIPI Alliance. "I2C/I3C" is variously used herein, for example, to indicate hardware (e.g., including a bus, interface, protocol logic and/or the like), the structure, logic and/or operation of which complies with or is otherwise compatible with a standard—such as that of an I2C specification or an I3C specification—for a bidirectional, serial control interface. CCI, which falls under CSI-2, provides a protocol for read-write access to registers of an imaging device. CCI is designed to be implemented, for example, with I2C or I3C interface hardware. CCI, which supports 400 kilohertz and 7-bit addressing, is a two-wire bidirectional, half-duplex, serial interface for controlling an image sensor.

Unless otherwise indicated, "low power state" (or LPS) refers to a mode of a PHY that, as compared to an alternative mode of that same PHY, consumes less power. The alternative PHY mode may enable a communication of a data packet—e.g., as a relatively high speed, but low voltage swing burst. As used herein, "LPS voltage signaling" refers to a voltage level, or range of voltage levels, of a signal that is communicated between PHYs while one such PHY—e.g., a source PHY—is in its respective LPS.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. Such devices may be portable or stationary. In some embodiments the technologies described herein may be employed in a desktop computer, laptop computer, smart phone, tablet computer, netbook computer, notebook computer, personal digital assistant, server, combinations thereof, and the like. More generally, the technologies described herein may be employed in any of a variety of electronic devices including interface logic (e.g., including hardware and/or executing software) to control communication of image information with a PHY.

FIG. 1 illustrates features of a system 100 to communicate image information according to an embodiment. System 100 is one example an embodiment wherein a source device and a sink device are coupled to communicate between one another one or more communications that conform, in at least some respects, to a serial interface standard—e.g., a CSI-2 standard—and/or a physical layer (PHY) standard that is associated with (for example, referenced by) that serial interface standard. In the embodiment shown, system 100 includes devices, represented by the illustrative source 110 and sink 140, that are coupled to one another via an interconnect 130 which supports such communications. Source 110 and sink 140 may include a transmit (TX) PHY 126 and a receive (RX) PHY 156, respectively, wherein I/O contacts at a hardware interface 128 of TX PHY 126 are variously coupled, via respective signal lines of interconnect 130, each to a corresponding one of I/O contacts at another hardware interface 158 of RX PHY 156.

Operation of TX PHY 126 to facilitate communication with RX PHY 156 may be coordinated and/or otherwise controlled by interface control logic 120 of source 110— e.g., wherein corresponding operations of RX PHY 156 are similarly controlled by interface control logic 150 of sink 140. For example, interface control logic 120 may include signaling logic 122 to variously communicate with TX PHY 126 signals representing data, commands and/or other information. Signals sent from interface control logic 120 to TX PHY 126 may be based at least in part on a protocol (represented functionally by protocol logic 124) that conforms, in at least some respects, to a protocol defined or otherwise indicated by a serial interface standard and/or an associated PHY standard. Alternatively or in addition, interface control logic 150 may include signaling logic 152 to communicate signals with RX PHY 156—e.g., wherein signaling from interface control logic 150 to RX PHY 156 is based at least in part on protocol logic 154 that also operates, in at least some respects, according to such a protocol. Although some embodiments are not limited in this regard, a command control interface 132 (such as a serial control interface) may further couple source 110 and sink 140—e.g., wherein the command control interface 132 bypasses TX PHY 126 and/or RX PHY 156 in coupling interface control logic 120 to interface control logic 150. In an embodiment, command control interface 132 facilitates sideband control communications that are compatible with an I2C standard.

In one illustrative embodiment of system 100, source 110 includes an image sensor and sink 140 includes an application processor. In another embodiment, source 110 includes an application processor and sink 140 includes a display. However, certain embodiments are not limited to a particular sink device and/or a particular source device. For example, devices may exchange bidirectional communications according to techniques discussed herein, where each such device functions both a sink device in one respect and as a source device in another respect. Communications between source 110 and source 140 may conform, in one or more respects, to at least some requirements of a serial interface specification and/or an associated PHY specification. For example, TX PHY 126 may operate to prepare information to be transmitted via interconnect 130, wherein RX PHY 156 processes corresponding signals that have been received via interconnect 130. Such preparations and processing may be according to a PHY standard such as that defined in a D-PHY specification. In another embodiment, TX PHY 126 and/or RX PHY 156 operate to perform communications that meet requirements of a C-PHY standard.

Requirements for LPS voltage signaling in a packet delimiter sequence—such as those variously imposed by certain interface standards (e.g., including CSI-2 standards)—tend to be a source of current leakage, for example. These LPS voltage signaling requirements may also impose power rail requirements to support relatively high voltage levels of the LPS voltage signaling. Embodiments variously mitigate such constraints by providing for operation of a PHY according to a protocol that is different, in one or more respects, from a conventional protocol identified by a CSI-2 (or other) interface standard and/or by a PHY standard associated with—e.g., referenced by—that interface standard.

As compared to such a conventional protocol, a communication protocol according to some embodiments may provide a different packet delimiter sequence (referred to herein as packet delimiter quick, or "PDQ") that has relatively low-voltage signaling. In some embodiments, a PDQ substantially shortens an overall duration of a packet delimiter, improving transport efficiency. Alternatively or in addition, one or more power states, power state indicators and/or power state transitions may be modified (from a conventional protocol) in an embodiment. A protocol according to some embodiments may provide a mechanism to introduce blanking to compensate for potential inefficiencies of a sink device. For example, one or more registers may reside on an image sensor (or other source device), where the registers are to be programmed with information defining whether and/or how control circuitry of the source device is to inject a blanking period into image data.

LRTE functionality at a source device may be exploited, in some embodiments, to mitigate inefficiencies that otherwise result from use of a legacy packet delimiter—e.g., wherein packets (including short packets and/or long packets, for example) are instead variously delimited from one another by one or more sequences that exploit such LRTE functionality. In addition to supporting use of a PDQ sequence, some embodiments may also utilize, at other times, another sequence (referred to herein as "packet delimiter long," or "PDL") to instead signal completion of multiple packets being transmitted, whereupon a PHY is to go into a relatively low power state (e.g., a conventional LP-111 mode of a C-PHY or a conventional LP-11 mode of a D-PHY). A PDL sequence may include a legacy end of transmission (ET) that is conventionally used when a HS packet transmission is complete—e.g., the ET to indicate transition of a PHY into a conventional quiet LP-11[1] state. In some embodiments, a PDL transmission replicates conventional ET $t_{3\text{-}POST}$ symbols—e.g., where a sink device is configured to distinguish a PDL from a PDQ based on an absence (or presence) of a sequence of "3" symbols.

Figure 2:
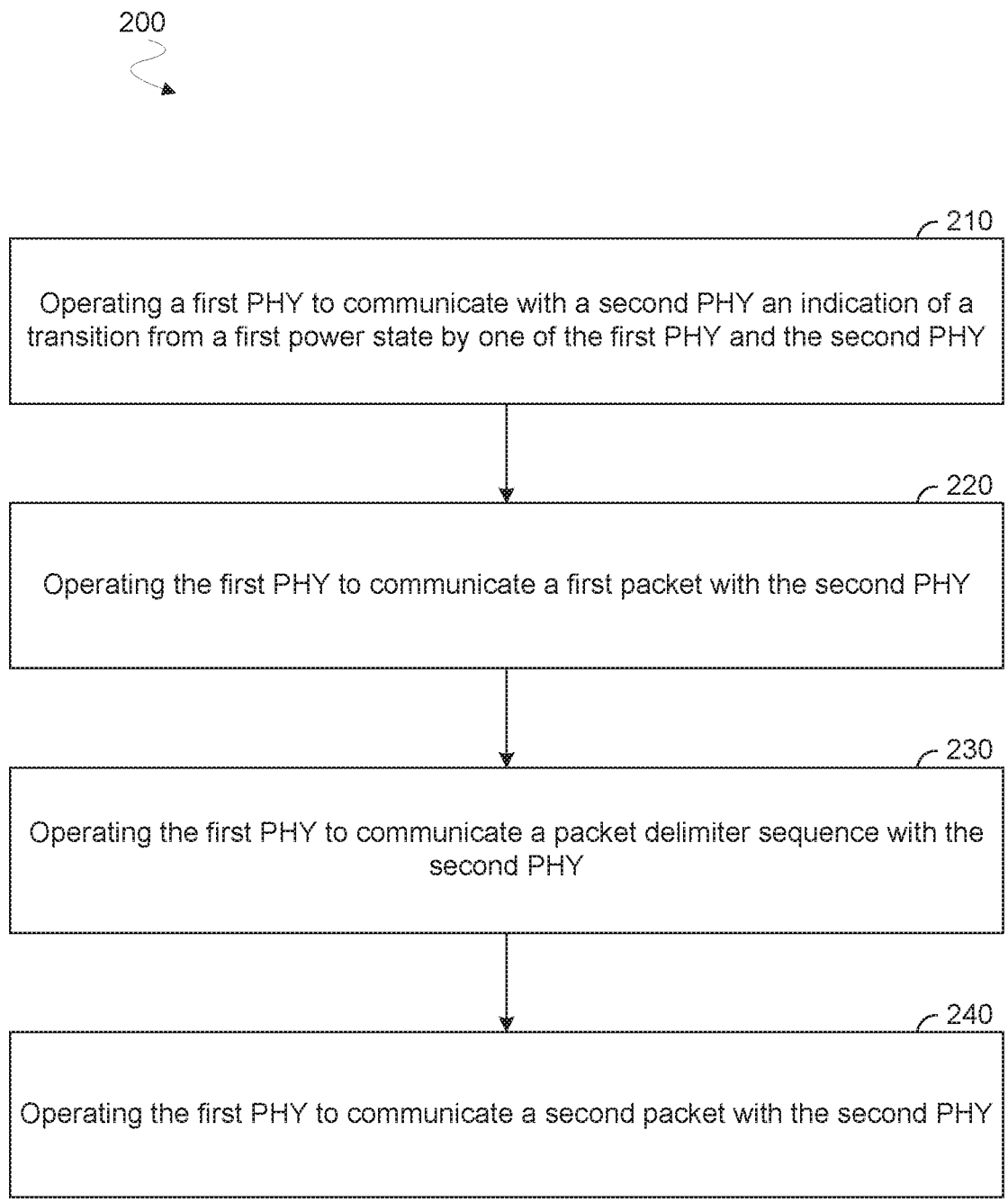
FIG. 2 is a flow diagram illustrating elements of a method for communicate image information according to an embodiment.

FIG. 2 illustrates elements a method 200 to communicate image information according to an embodiment. Some or all operations of method 200 may be performed with circuitry of system 100—e.g., by one or more components of source 110 or of sink 140. By way of illustration and not limitation, some or all operations of method 200 may be performed by interface control logic 120 or, alternatively, by interface control logic 150. Method 200 is one example of an embodiment that facilitates communication of a plurality of packages during a relatively high power state of a PHY—e.g., wherein the plurality of packages each have a respective format that is identified in an interface standard such as that of a MIPI CSI-2 specification. Such communication may forego a transition to a relatively low power state, where such a transition would otherwise take place according to a conventional protocol that is specified or otherwise referred to by that interface standard.

In an embodiment, method 200 includes, at 210, operating a first PHY to communicate with a second PHY—e.g., to send to the second PHY or to receive from the second PHY—an indication of a transition from a first power state by one of the first PHY and the second PHY. For example, the first PHY and second PHY may be coupled to one another via an interconnect that is compatible with a PHY standard such as that of a MIPI D-PHY specification or a MIPI C-PHY specification. The indication of the transition from the first power state may include a characteristic of a signal communicated via a lane of the interconnect—e.g., a transition of the signal from a given voltage level (or range of voltage levels) that, according to a conventional protocol, is supported by a PHY during the first power state, but not during another PHY power state the facilitates communication of a package. Such a conventional protocol may be specified or otherwise indicated, for example, by a serial interface standard (e.g., a camera serial interface standard) such as that of a CSI-2 specification. The protocol may additionally or alternatively be specified in a PHY standard that, for example, is referenced by the serial interface standard. For example, the protocol may be described in C-PHY standard or a D-PHY standard of any of a variety of MIPI specifications.

Method 200 may further comprise operating the first PHY to communicate with the second PHY—e.g., to send to the second PHY or to receive from the second PHY—a first packet (at 220), a packet delimiter sequence (at 230) and a second packet (at 240). In an embodiment, the packet delimiter sequence is communicated at 230 in between communication of the first packet at 220 and communication of the second packet at 240. Communication of a plurality of packets (e.g., including at least the first packet and the second packet) and the packet delimiter sequence via the interconnect lane may take place both after a first transition from the first power state and prior to any other transition to the first power state (the other transition subsequent to the first transition) by the one of the first PHY and the second PHY.

In one embodiment, some or all of the operating at 210, 220, 230, 240 includes interface control logic sending control signals to the one of the first PHY and the second PHY—e.g., wherein such control signals are based at least in part on monitoring of the one of the first PHY and the second PHY by the interface control logic. Such operating may include operating the first PHY to receive a plurality of packets or, alternatively, to send a plurality of packets. The packet delimiter sequence communicated at 230 may include a concatenation of an end of transmission sequence, a preamble sequence and a synchronization bit sequence, some or all of which may be indicated by the serial interface specification and/or defined by a C-PHY specification referenced by the serial interface specification. In another embodiment, the packet delimiter sequence communicated at 230 includes a concatenation of an end of transmission (ET) sequence and a start of transmission (ET) sequence, one or both of which may be indicated by the serial interface specification and/or defined by a D-PHY specification referenced by the serial interface specification.

Figure 3A:
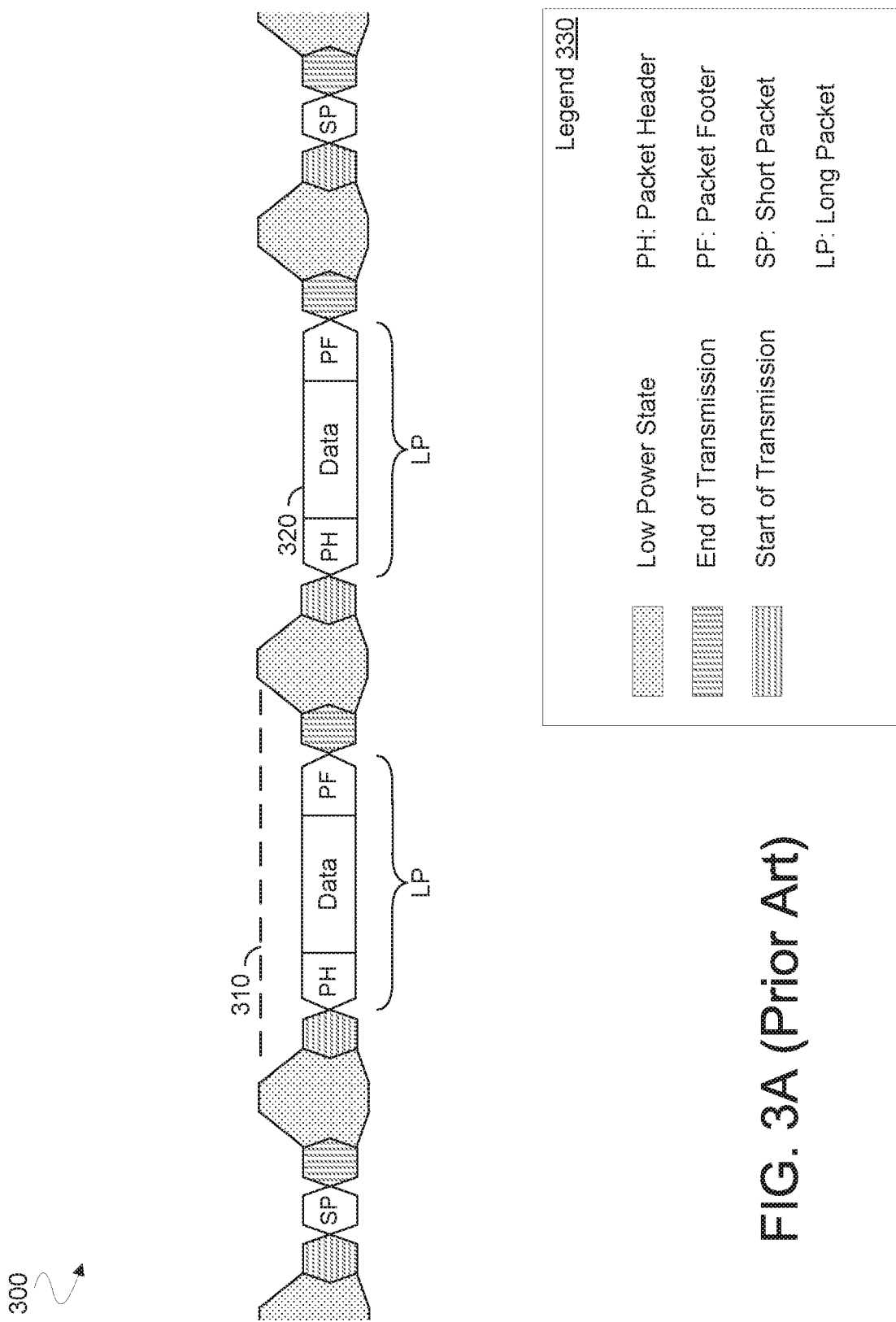
FIG. 3A is a timing diagram illustrating elements of protocol packet format of an existing serial interface standard.
Figure 3B:
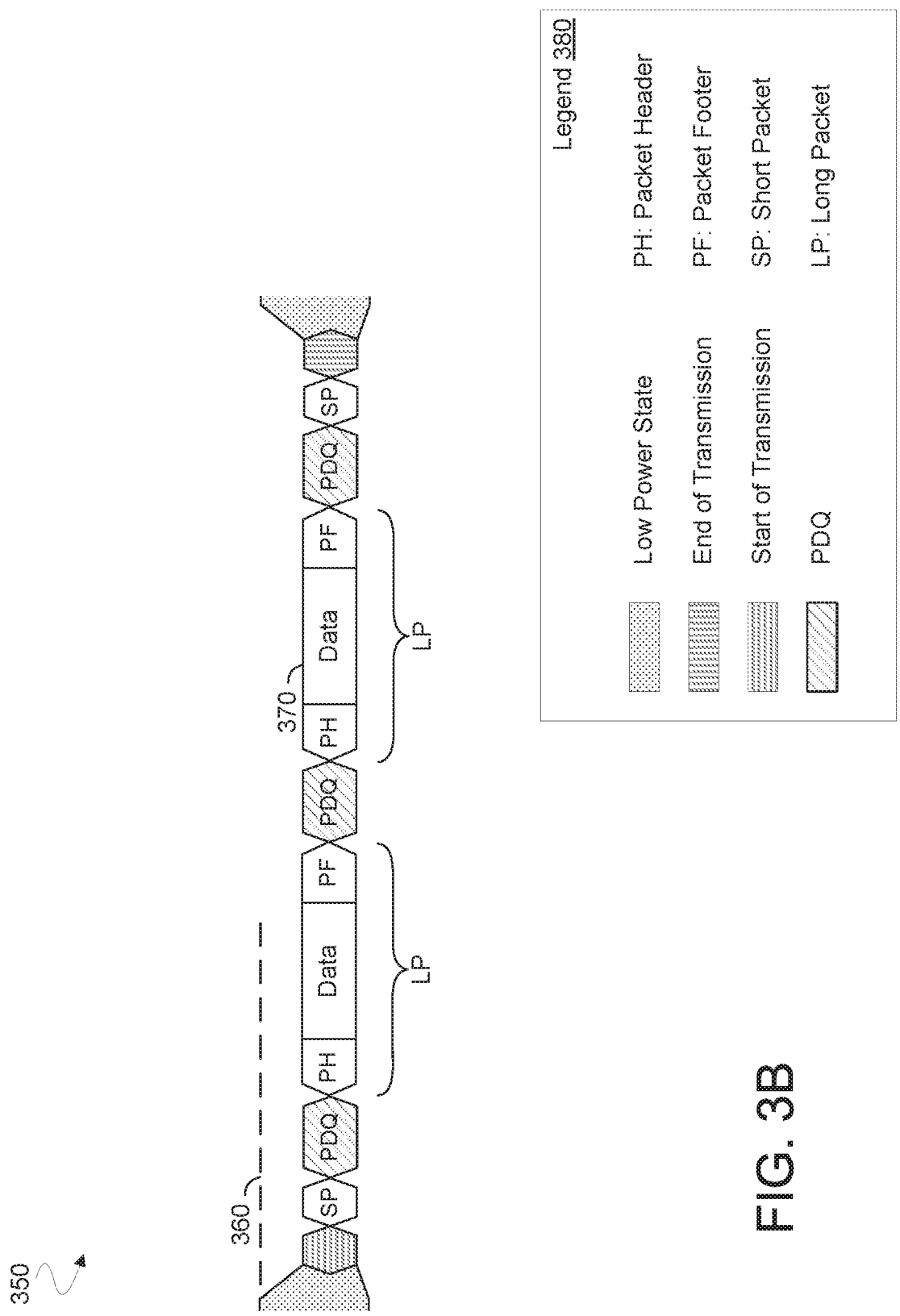
FIG. 3B is a timing diagram illustrating elements of signaling to communicate image information according to an embodiment.

FIGS. 3A, 3B illustrate improvements variously provided by some embodiments, as compared to signaling techniques according to a conventional serial interface standard. FIG. 3A shows a timing diagram 300 representing respective portions of signaling communicate via a lane of an interconnect that is coupled between two PHYs that are operated according to a conventional protocol of an interface standard such as that of a CSI-2 specification. The signaling of FIG. 3A may, for example, be according to a sequence defined for high-speed data burst communication by a conventional C-PHY specification (e.g., MIPI C-PHY version 1.0).

Timing diagram 300 shows time periods when a PHY operates in a power state (mode) during which less power is consumed—e.g., as compared to another power state during which the PHY is communicating a data burst. An LPS is indicated by signaling at a level (such as the illustrative voltage level 310) greater than a highest voltage level 320 that is used to represent data bits during a data burst. As indicated by legend 330 of FIG. 3A, the LPS voltage signaling period is part of a sequence that delimits packets from one another in signaling communicated via a given interconnect lane. Such a packet delimiter sequence further comprises an end of transmission sequence and a start of transmission sequence that precede and follow, respectively, the LPS voltage signaling period. Packets to be communicated via such signaling are variously formatted according to a respective format that is specified, referenced or otherwise indicated by an interface standard (e.g., where the format is defined in a PHY specification that is referenced by a CSI-2 specification). Timing diagram 300 represents a communication of packets that variously have a long packet (LP) format or a short packet (SP) format. The LP format includes a packet header (PH) portion and a packet footer (PF) portion that are to precede and follow, respectively, a payload data portion. The SP format omits at least some of information communicated using the PH and PF portions.

FIG. 3B shows timing diagram 350 representing signaling communicated, according to an embodiment, via an interconnect lane coupled to a PHY that is operated according to protocol that deviates, in part, from one indicated in a serial interface standard. Legend 380 lists various components of the signal communicated in timing diagram 350. The signaling of timing diagram 350 may be communicated using circuitry of one of source 110 and sink 140—e.g., where such communication is performed according to method 200.

As shown in timing diagram 350, a PDQ sequence delimits successive packets from one another—e.g., in lieu of such packets being delimited by the packet delimiter sequence shown in timing diagram 300. In an embodiment, the PDQ sequence is communicated independent of any LPS voltage signaling and/or independent of any transition of one or both PHYs to a LPS. By way of illustration and not limitation, various bits of a PDQ sequence may be represented by a voltage level 370 that is also used to represent data bits of a packet—e.g., wherein voltage level 370 is less than another voltage level 360 which is indicative of a LPS of a PHY. In avoiding a transition to voltage level 360 during the PDQ sequence, some embodiments mitigate current leakage that might otherwise take place due to some conventions of a CSI-2 standard (for example). Alternatively or in addition, some embodiments may utilize a PDQ sequence that has a relatively shorter brief overall duration in time—e.g., as compared to the duration of the packet delimiter sequence represented in timing diagram 300.

In an embodiment, packets delimited from one another by a PDQ sequence of timing diagram 350 each have a respective format—e.g., one of the LP format and the SP format illustrated in timing diagram 300—that is specified or otherwise indicated by the interface standard. As illustrated at the beginning and end of timing diagram 350, some embodiments may variously transition a communication from and back to LPS voltage signaling—e.g., prior to and after (respectively) a burst communication of multiple packets which are variously delimited from one another by one or more PDQ sequences.

Figure 4A:
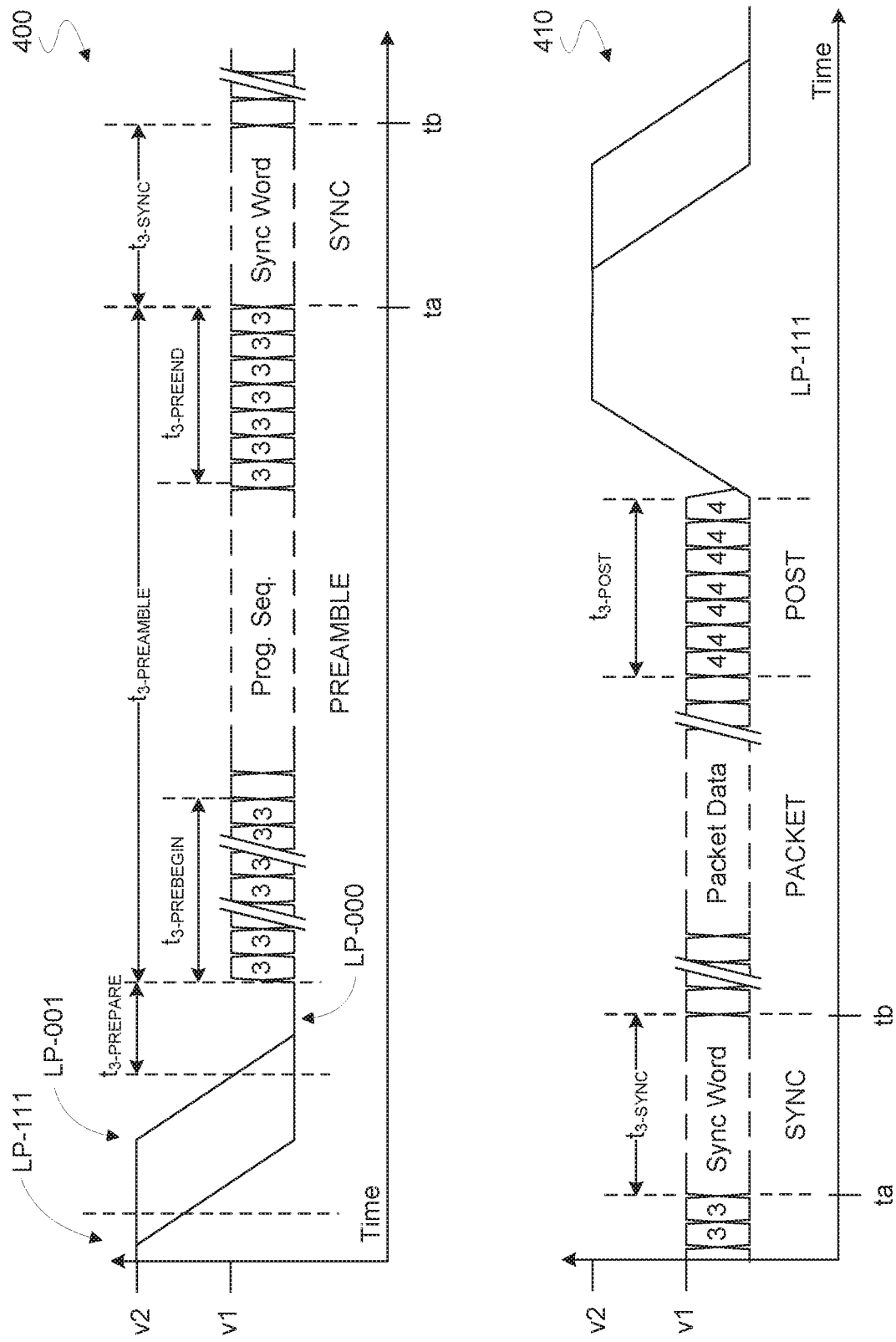
FIG. 4A is a timing diagram illustrating elements of protocol packet format of an existing camera physical layer standard.
Figure 4B:
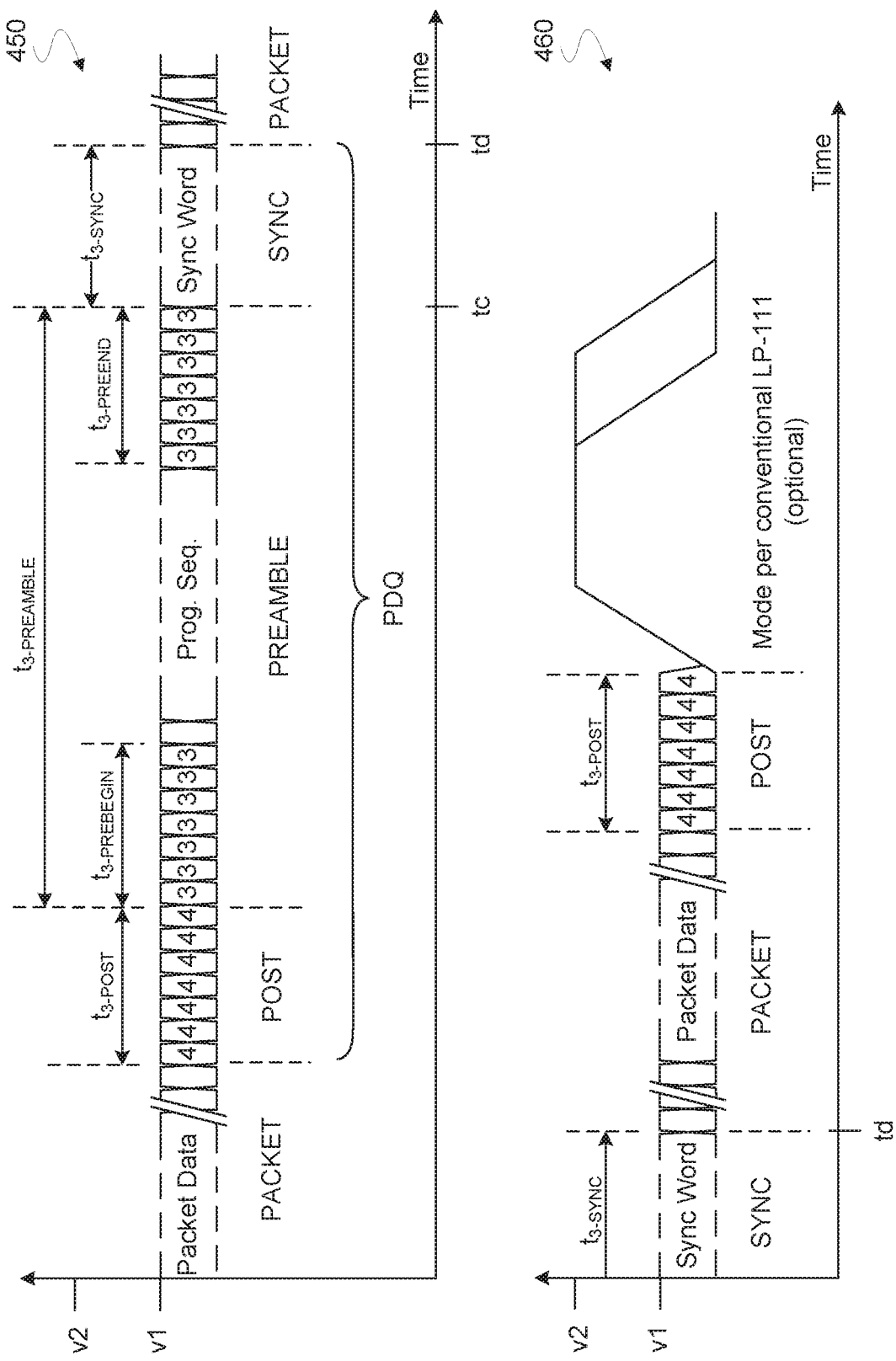
FIG. 4B is a timing diagram illustrating elements of signaling to communicate image information according to an embodiment.

FIGS. 4A, 4B illustrate improvements, provided by various embodiments, over conventional C-PHY signaling techniques according to a protocol of a CSI-2 standard. FIG. 4A shows timing diagrams 400, 410 representing respective portions of signaling communicated via a lane of an interconnect that is coupled between two C-PHYs (e.g., each C-PHY compatible with a MIPI C-PHY standard). The signaling of FIG. 4A may have signaling characteristic shown in timing diagram 300—e.g., wherein the signaling is according to a sequence defined for high-speed data burst communication by a conventional C-PHY specification (e.g., MIPI C-PHY version 1.0). For clarity in illustrating the signaling of FIG. 4A, timing diagrams 400, 410 partially overlap one another along the time domain shown—e.g., wherein a period between times ta, tb of the signaling is shown in both of timing diagrams 400, 410.

FIG. 4A identifies time periods during which a C-PHY variously operates in different power states LP-111, LP-001, LP-000 described in the C-PHY standard. The power state LP-000 is a preparation phase that, according to a conventional C-PHY standard, takes place prior to a PHY transferring a burst of high speed (HS) data. The power state LP-111—during which the C-PHY consumes relatively low power—is a low/quiet communication state that, according to existing C-PHY conventions, takes place after a HS data burst communication is completed. During LP-111 of a C-PHY, the signal is at a voltage level (such as the illustrative v2) greater than a highest voltage level v1 that is used to represent data bits during a HS data burst. The power state LP-001, which represents a state during which the C-PHY transitions from LP-111 to LP-000, is indicated by a transition of the signal from voltage level v2 (e.g., 1.2 V) to a baseline voltage level before a HS data burst is to be communicated.

The HS data burst sequence in timing diagrams 400, 410 includes a start of transmission sequence (PREAMBLE and SYNC) during successive time periods $t_{3\text{-}PREAMBLE}$, $t_{3\text{-}SYNC}$, followed by a data packet (PACKET) which, in turn, is followed by an end of transmission (POST) sequence during a time period $t_{3\text{-}POST}$. According to MIPI C-PHY version 1.0, for example, a beginning of PREAMBLE is indicated during a time period $t_{3\text{-}PREBEGIN}$ by a sequence of "3" symbols (e.g., including one or more groups of seven "3" symbols), and an end of PREAMBLE is indicated during a time period $t_{3\text{-}PREEND}$ by a sequence of seven "3" symbols. The SYNC portion includes a sequence (e.g., [3, 4, 4, 4, 4, 4, 3]) that is recognized by a sink PHY as immediately preceding the beginning of the next packet. For C-PHY based communications controlled by a conventional serial interface such as that according to a CSI-2 standard, any packet is delimited from a next successive packet (or from a latest preceding packet) by an instance of a sequence including POST, LPS voltage signaling, PREAMBLE and SYNC.

FIG. 4B shows timing diagrams 450, 460 representing respective portions of signaling communicated, according to an embodiment, via an interconnect lane coupled between PHYs including a C-PHY that is operated according to protocol that deviates, in part, from a standard protocol indicated in a CSI-2 specification (e.g., where the standard protocol is also set forth in a C-PHY specification referenced by the CSI-2 specification). The signaling of timing diagrams 450, 460 may be communicated using circuitry of one of source 110 and sink 140—e.g., where such communication is performed according to method 200. Such signaling may have characteristics of timing diagram 350. Respective time domains of diagrams 450, 460 partially overlap one another—e.g., wherein timing diagram 450 shows signaling during a period between times tc, td, and timing diagram 460 shows signaling prior to (as well as further signaling after) time td.

As shown in timing diagrams 450, 460, a PDQ sequence delimits successive packets from one another independent of any transition of the signal to a relatively high voltage (e.g., v2) that, according to a conventional protocol, is indicative of a LPS of a C-PHY. Although some embodiments are not limited in this regard, the PDQ sequence may comprise successive POST, PREAMBLE and SYNC portions communicated during time periods of respective durations $t_{3\text{-}POST}$, $t_{3\text{-}PREAMBLE}$ and $t_{3\text{-}SYNC}$. In an embodiment, a PDQ sequence, including high speed control symbols, is used to delimit successive packets—e.g., in lieu of some or all of a legacy CSI-2 packet delimiter sequence such as that shown in timing diagrams 400, 410. A PDQ may be signaled, for example, between a current short or long packet and a next subsequent short or long packet. In one illustrative embodiment, a PDQ sequence comprises a sequence {4,4,4,4,4,4, 4,3,3,3,3,3,3,3} including seven (7) of the control code symbol "4" during $t_{3\text{-}POST}$ followed by seven (7) of the control code symbol "3" during $t_{3\text{-}PREBEGIN}$. Alternatively, a PDQ sequence may reuse a legacy SYNC code word {3,4, 4,4,4,4,3}. Such PDQ sequencing is just one example of an efficient delimiter that mitigates time and/or current leakage overhead associated with conventional LPS voltage signaling, while availing of other existing signaling conventions (which can exploit at least some existing circuit logic design to support such signaling conventions).

Figure 5A:
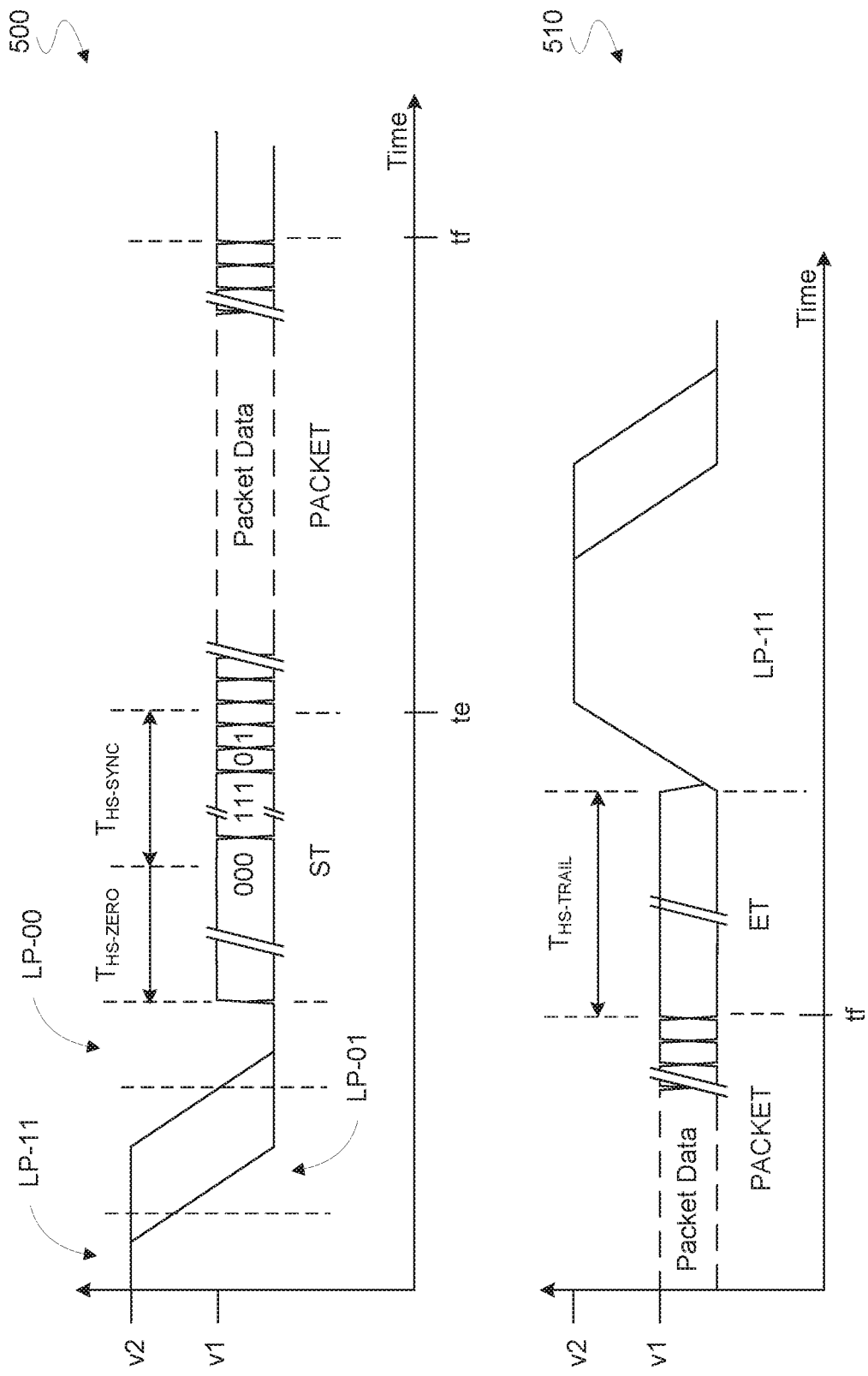
FIG. 5A is a timing diagram illustrating elements of protocol packet format of an existing differential physical layer standard.
Figure 5B:
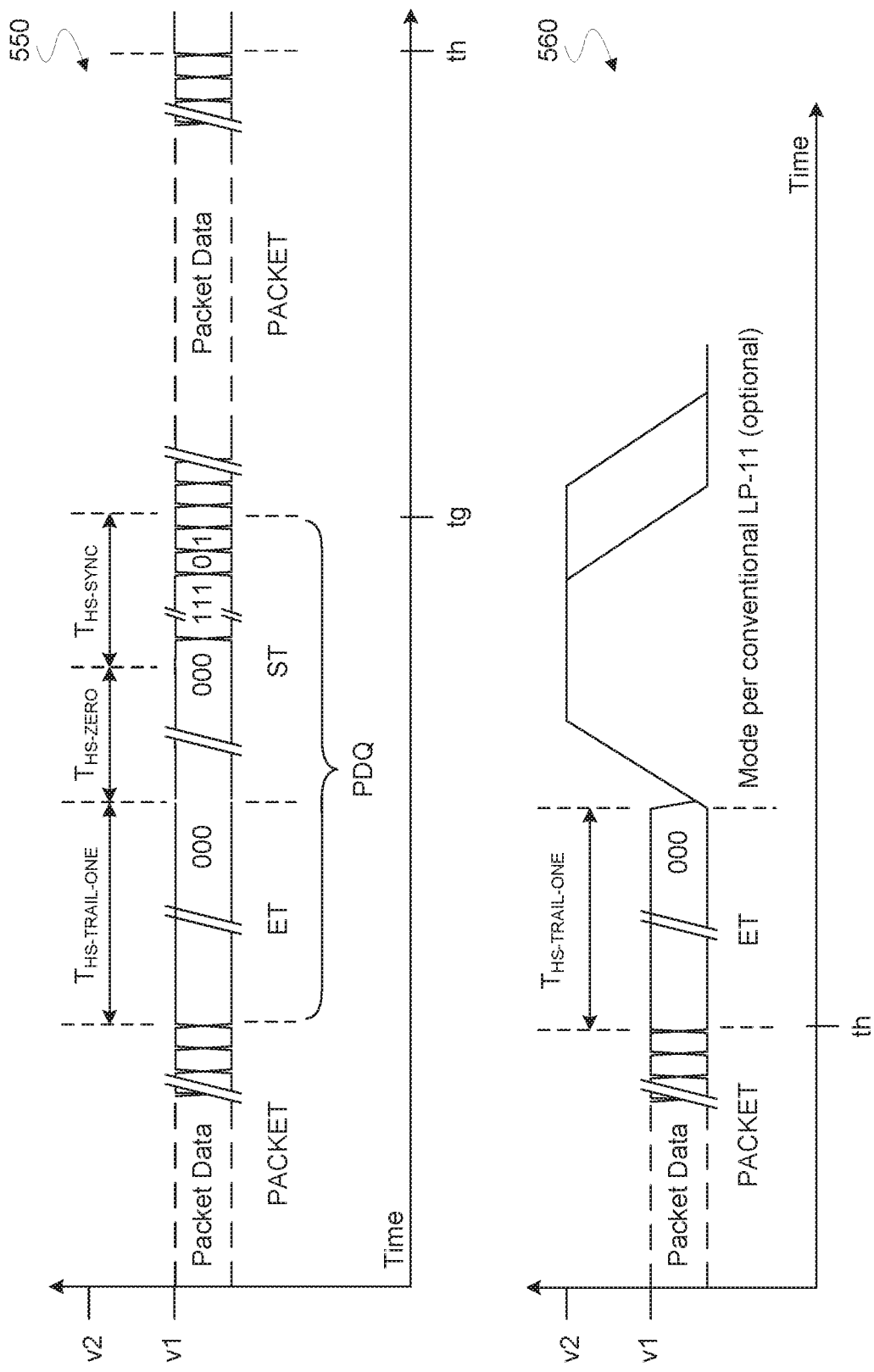
FIG. 5B is a timing diagram illustrating elements of signaling to communicate image information according to an embodiment.

FIGS. 5A, 5B illustrate improvements provided by various embodiments over conventional D-PHY signaling techniques according to a protocol of a CSI-2 standard. FIG. 5A shows timing diagrams 500, 510 representing respective portions of signaling communicated via an interconnect lane coupled between D-PHYs (e.g., each compatible with a MIPI D-PHY standard). The signaling may have signaling characteristic of timing diagram 300—e.g., wherein the signaling is according to a sequence defined for high-speed data burst communication by a conventional D-PHY specification (e.g., MIPI D-PHY version 1.2). Respective time domains of diagrams 500, 510 partially overlap one another—e.g., wherein timing diagram 500 shows signaling during a period between times te, tf, and timing diagram 510 shows some signaling prior to (as well as further signaling after) time tf.

FIG. 5A identifies time periods during which a D-PHY variously operates in respective power states LP-11, LP-01, LP-00 described in the D-PHY standard. Functionally, power states LP-11, LP-01, LP-00 correspond to power states LP-111, LP-001, LP-000, respectively. The voltage levels v1, v2 shown in timing diagrams 500, 510 may be the same respective voltage levels v1, v2 shown in timing diagrams 400, 410, for example. A HS data burst sequence in timing diagrams 500, 510 includes a start of a transmission sequence (ST) during successive time periods $t_{HS\text{-}ZERO}$, $t_{HS\text{-}SYNC}$, followed by a data packet (PACKET) which, in turn, is followed by an end of transmission (ET) sequence during a time period $t_{HS\text{-}TRAIL}$. For D-PHY based communications controlled by a conventional serial interface such as that according to a CSI-2 standard, any packet is delimited from a next successive packet (or from a latest preceding packet) by an instance of a sequence including ET, LPS voltage signaling and ST. In FIG. 5A, the D-PHY protocol indicates ET by taking the last bit of the high-speed packet data, flipping it, and maintaining this flipped state for some predetermined duration $T_{HS\text{-}TRAIL}$. The flipped and sustained bit is recognized according to various D-PHY standards as serving functionally as an ET sequence.

FIG. 5B shows timing diagrams 550, 560 representing respective portions of signaling communicated, according to an embodiment, via an interconnect lane coupled between D-PHYs. The signaling of timing diagrams 550, 560 may be communicated using circuitry of one of source 110 and sink 140—e.g., where such communication is performed according to method 200. Such signaling may have characteristics of timing diagram 350—e.g., wherein the signaling is according to a protocol that deviates, in part, from a protocol identified or otherwise indicated in an interface standard. Respective time domains of diagrams 550, 560 partially overlap one another—e.g., wherein timing diagram 550 shows signaling during a period between times tg, th, and timing diagram 560 shows signaling prior to (as well as further signaling after) time th.

As shown in timing diagrams 550, 560, a PDQ sequence delimits successive packets from one another independent of any transition of the signal to a relatively high voltage (such as v2) that, according to a conventional protocol, is indicative of a LPS of a D-PHY. Although some embodiments are not limited in this regard, the PDQ sequence may comprise portions communicated during successive time periods of respective durations $T_{HS\text{-}TRAIL\text{-}ONE}$, $T_{HS\text{-}ZERO}$, $T_{HS\text{-}SYNC}$. The duration for $T_{HS\text{-}TRAIL}$-ONE may be the same as the legacy $T_{HS\text{-}TRAIL}$ in timing diagram 510. However, in some embodiments, the signaling during $T_{HS\text{-}TRAIL\text{-}ONE}$ may include (for example) a sequence of binary "1" bits—e.g., in lieu of the conventional technique of inverting a last bit of a preceding HS burst. After the sequence during $T_{HS\text{-}TRAIL\text{-}ONE}$, the PDQ sequence may provide a legacy sequence during time periods $T_{HS\text{-}ZERO}$, and $T_{HS\text{-}SYNC}$.

Certain embodiments further provide for at least partial modification of power states such as D-PHY modes LP-00, LP-11 and/or C-PHY modes LP-000, LP-111—e.g., to reduce a number and/or output level of high voltage rails that might otherwise be required to facilitate operation of a PHY. By way of illustration and not limitation, an otherwise conventional C-PHY mode LP-111 may be indicated by the three wires of a C-PHY lane each outputting a respective LPS voltage that is between a lower threshold of 225 milliVolts (mV) voltage and a maximum level of 990 mV (e.g., rather than 1.2V). Such a maximum level may instead be less than 900 mV, for example. In such an embodiment, an otherwise conventional C-PHY mode LP-000 may be indicated by three wires of a C-PHY lane each outputting a respective voltage that is below the 225 mV threshold (e.g., where each is set to 0 mV).

In another embodiment, an otherwise conventional D-PHY mode LP-11 may be indicated by the p-wire and n-wire of a D-PHY lane each outputting a respective LPS voltage that is between a lower threshold of 200 mV voltage and a maximum level of 880 mV (e.g., rather than 1.2V). Such a maximum level may instead be less than 880 mV, for example. In such an embodiment, an otherwise conventional D-PHY mode LP-00 may be indicated by the p-wire and n-wire of a D-PHY lane each outputting a respective voltage that is below the 200 mV threshold.

The conventional C/D-PHY modes LP-111 and LP-11 variously disable signal toggling at I/O pads, and shut off termination to save power. Conventionally, the three wires of a C-PHY lane typically require 400 mV. In some embodiments, a sink device (or source device) may variously park the three wires of such a C-PHY lane to a supply voltage rail (i.e. 700 mV or 800 mV), and turn off an on-die 400 mV regulator to save power. This may mitigate the need to disable termination, since any current on the three wires may be negligible. A subsequent transition from LP-11[1] to LP-00[0] may be efficiently implemented by enabling the 400 mV regulator.

In some embodiments, a source device includes one or more registers—e.g., including two 16-bit registers—that are programmed, or are capable of being (re)programmed, to support periodic insertion of blanking, such as horizontal blanking, in image data. The source device may include registers that are programmed/programmable to receive, provide or otherwise determine reference information that specifies or otherwise indicates a frequency of blanking, size of blanking and/or the like. Such registers may be configured, for example, by programming logic included in or coupled to the image sensor—e.g., in response to an identifier of the sink device to which the source device is coupled. In an embodiment, functionality of a Camera Control Interface according to conventional techniques may be adapted to provide for programming of such registers. Depending on its ability, or inability, to communicate back-to-back packets without a transition to a LPS mode, an application processor (or other sink device) could selectively program an image sensor (or other source device) accordingly to artificially introduce a suitable blanking period frequency, duration and/or the like.

By way of illustration and not limitation, a source device may include or otherwise have access to one or more registers including a sixteen bit register TX_REG_CSI2_LRTE_INSERT_BLANKING[15:0] that is programmable to store information defining how often (e.g., in terms of rows) a blanking period is to be inserted into image data. Table 1 below illustrates an example listing of configurations for TX_REG_CSI2_LRTE_INSERT_BLANKING[15:0].

TABLE 1

TX_REG_CSI2_LRTE_INSERT_BLANKING [15:0]

| Value (in decimal) | Definition |
|---|---|
| 0 | No need for Blanking/Blanking insertion disabled |
| 1 | Insertion of Blanking every row or packet |
| 2 | Insertion of Blanking at least every 2 rows or packets |
| 3 | Insertion of Blanking at least every 3 rows or packet |
| ... | ... |
| 65,535 | Insertion of Blanking at least every 65,535 rows or packet |

The one or more registers may additionally or alternatively include a sixteen bit register TX_REG_CSI2_LRTE_BLANKING_DURATION[15:0] that is programmable to facilitate insertion of LRTE protocol blanking intervals for rows or packets of CSI-2 data. For example, a blanking interval may contain multiples of 8'hFF byte padding in the case of D-PHY communication, or 16'hFFFF word padding in the case of C-PHY communication. Table 2 below illustrates another example listing of configurations for TX_REG_CSI2_LRTE_BLANKING_DURATION[15:0].

TABLE 2

TX_REG_CSI2_LRTE_BLANKING_DURATION [15:0]

| Value (in decimal) | Definition (CSI-2 over D-PHY) | Definition (CSI-2 over C-PHY) |
|---|---|---|
| 0 | 1 byte | 1 word |
| 1 | 2 bytes | 2 words |
| 2 | 3 bytes | 3 words |
| 3 | 4 bytes | 4 words |
| ... | ... | ... |
| 65,535 | 65,536 bytes | 65,536 words |

A source device may have access to fewer, more and/or differently configured (e.g., larger or smaller) registers to configure blanking functionality, in different embodiments.

In some embodiments, support for a PDQ sequence having a relatively short time duration (e.g., as compared to that of a conventional C-PHY or D-PHY package delimiter sequence) may enable increased throughput of image data. For example, signal communications according to an embodiment may be performed with integrated circuitry that functions—e.g., as a bridge chip—to aggregate, concatenate or otherwise combine packets from multiple sources. A sink device coupled to such a bridge may configure image sensor devices (and/or other such sources) with relatively higher frequency or duration of blanking intervals. CSI-2 v2.0 mechanisms, which facilitate up to eight (8) virtual channels per sensor, may be adapted to differentiate image formats across multiple sensors connected via an aggregator/bridge device.

In some embodiments, the respective voltage signaling that variously indicates C-PHY modes LP-000, LP-111 (or alternatively, that variously indicates D-PHY modes LP-00, LP-11) may be modified into a single type of PHY state voltage signaling. For example, a requirement for relatively high voltage signaling during LP-11 (or LP-111) may be dropped altogether.

Figure 6:
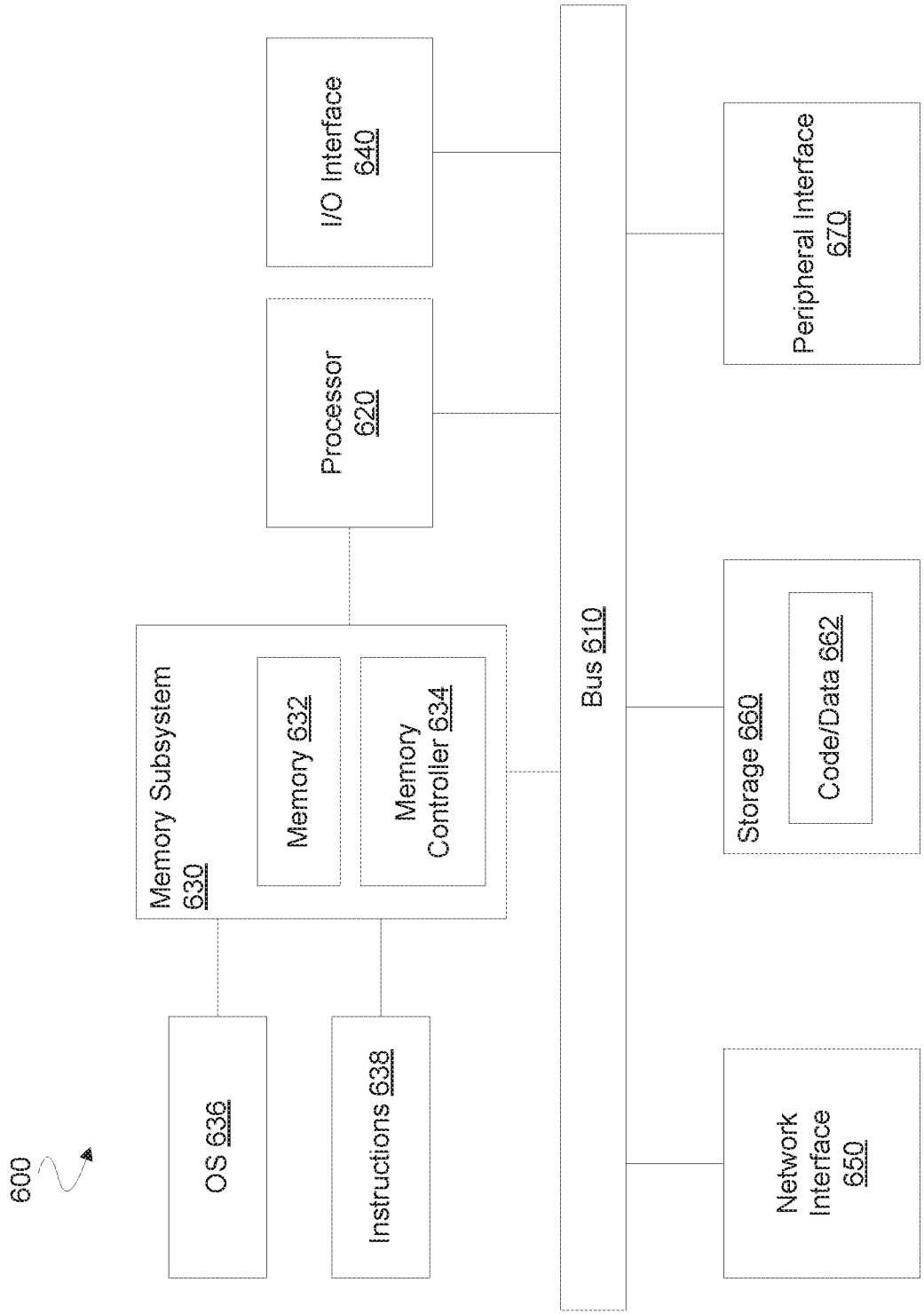
FIG. 6 is a high-level functional block diagram illustrating elements of a computer system to participate in a communication of image information according to an embodiment.

FIG. 6 is a block diagram of an embodiment of a computing system in which a communication of image data may be implemented. System 600 represents a computing device in accordance with any embodiment described herein, and may be a laptop computer, a desktop computer, a server, a gaming or entertainment control system, a scanner, copier, printer, or other electronic device. System 600 may include processor 620, which provides processing, operation management, and execution of instructions for system 600. Processor 620 may include any type of microprocessor, central processing unit (CPU), processing core, or other processing hardware to provide processing for system 600. Processor 620 controls the overall operation of system 600, and may be or include, one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 630 represents the main memory of system 600, and provides temporary storage for code to be executed by processor 620, or data values to be used in executing a routine. Memory subsystem 630 may include one or more memory devices such as read-only memory (ROM), flash memory, one or more varieties of random access memory (RAM), or other memory devices, or a combination of such devices. Memory subsystem 630 stores and hosts, among other things, operating system (OS) 636 to provide a software platform for execution of instructions in system 600. Additionally, other instructions 638 are stored and executed from memory subsystem 630 to provide the logic and the processing of system 600. OS 636 and instructions 638 are executed by processor 620.

Memory subsystem 630 may include memory device 632 where it stores data, instructions, programs, or other items. In one embodiment, memory subsystem includes memory controller 634, which is a memory controller in accordance with any embodiment described herein, and which provides mechanisms for monitoring performance of memory device 632. In one embodiment, memory controller 634 provides commands to memory device 632. The commands may be for memory device 632 to access data—e.g., on behalf of processor 620.

Processor 620 and memory subsystem 630 are coupled to bus/bus system 610. Bus 610 is an abstraction that represents any one or more separate physical buses, communication lines/interfaces, and/or point-to-point connections, connected by appropriate bridges, adapters, and/or controllers. Therefore, bus 610 may include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 610 may also correspond to interfaces in network interface 650.

System 600 may also include one or more input/output (I/O) interface(s) 640, network interface 650, one or more internal mass storage device(s) 660, and peripheral interface 670 coupled to bus 610. I/O interface 640 may include one or more interface components through which a user interacts with system 600 (e.g., video, audio, and/or alphanumeric interfacing). Network interface 650 provides system 600 the ability to communicate with remote devices (e.g., servers, other computing devices) over one or more networks. Network interface 650 may include an Ethernet adapter, wireless interconnection components, USB (universal serial bus), or other wired or wireless standards-based or proprietary interfaces.

Storage 660 may be or include any conventional medium for storing large amounts of data in a nonvolatile manner, such as one or more magnetic, solid state, or optical based disks, or a combination. Storage 660 holds code or instructions and data 662 in a persistent state (i.e., the value is retained despite interruption of power to system 600). Storage 660 may be generically considered to be a "memory," although memory 630 is the executing or operating memory to provide instructions to processor 620. Whereas storage 660 is nonvolatile, memory 630 may include volatile memory (i.e., the value or state of the data is indeterminate if power is interrupted to system 600).

Peripheral interface 670 may include any hardware interface not specifically mentioned above. Peripherals refer generally to devices that connect dependently to system 600. A dependent connection is one where system 600 provides the software and/or hardware platform on which operation executes, and with which a user interacts.

Figure 7:
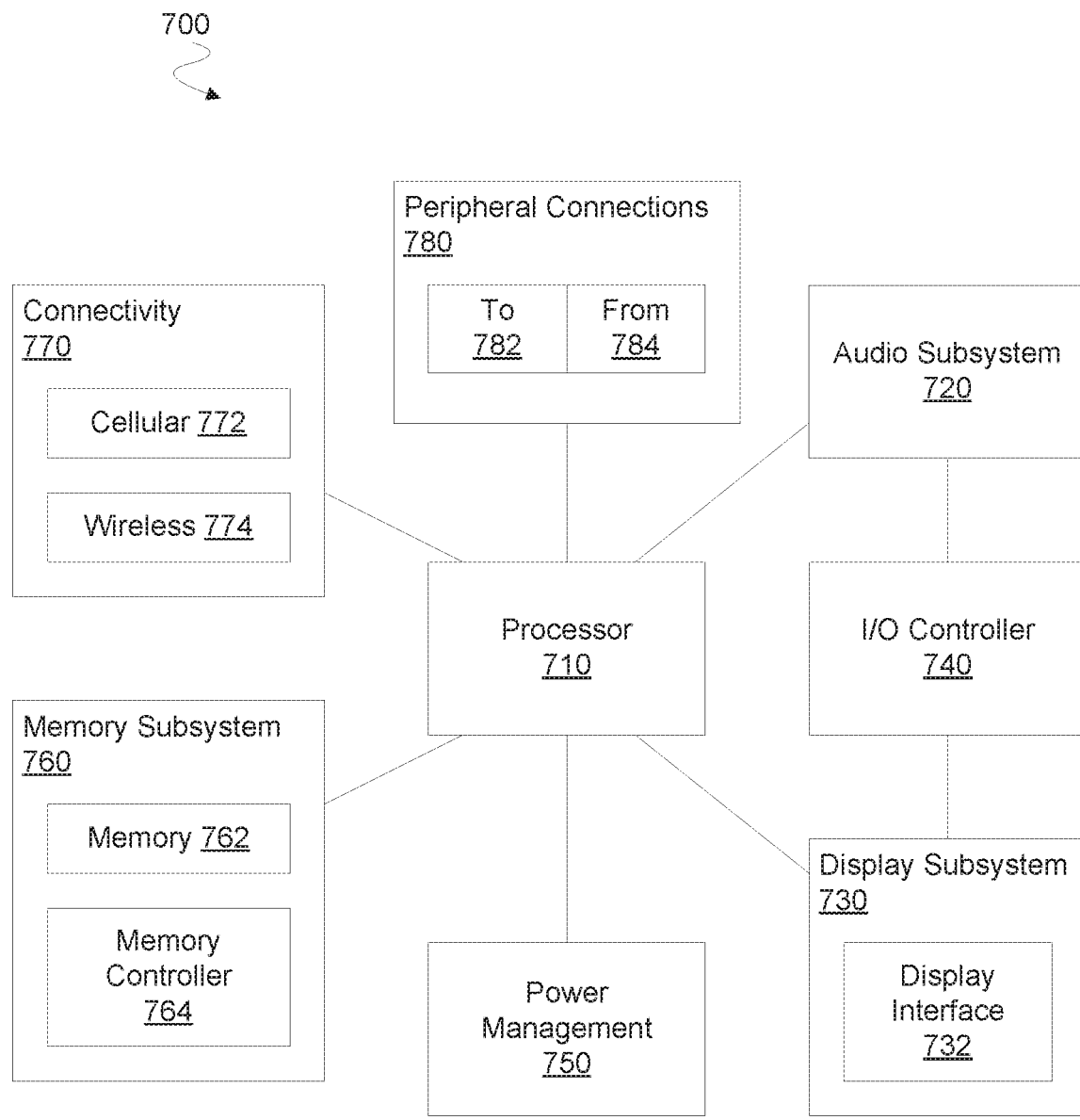
FIG. 7 is a high-level functional block diagram illustrating elements of a computer device to participate in a communication of image information according to an embodiment.

FIG. 7 is a block diagram of an embodiment of a mobile device in which a communication of image data may be implemented. Device 700 represents a mobile computing device, such as a computing tablet, a mobile phone or smartphone, a wireless-enabled e-reader, or other mobile device. It will be understood that certain of the components are shown generally, and not all components of such a device are shown in device 700.

Device 700 may include processor 710, which performs the primary processing operations of device 700. Processor 710 may include one or more physical devices, such as microprocessors, application processors, microcontrollers, programmable logic devices, or other processing means. The processing operations performed by processor 710 include the execution of an operating platform or operating system on which applications and/or device functions are executed. The processing operations include operations related to I/O (input/output) with a human user or with other devices, operations related to power management, and/or operations related to connecting device 700 to another device. The processing operations may also include operations related to audio I/O and/or display I/O.

In one embodiment, device 700 includes audio subsystem 720, which represents hardware (e.g., audio hardware and audio circuits) and software (e.g., drivers, codecs) components associated with providing audio functions to the computing device. Audio functions may include speaker and/or headphone output, as well as microphone input. Devices for such functions may be integrated into device 700, or connected to device 700. In one embodiment, a user interacts with device 700 by providing audio commands that are received and processed by processor 710.

Display subsystem 730 represents hardware (e.g., display devices) and software (e.g., drivers) components that provide a visual and/or tactile display for a user to interact with the computing device. Display subsystem 730 may include display interface 732, which may include the particular screen or hardware device used to provide a display to a user. In one embodiment, display interface 732 includes logic separate from processor 710 to perform at least some processing related to the display. In one embodiment, display subsystem 730 includes a touchscreen device that provides both output and input to a user.

I/O controller 740 represents hardware devices and software components related to interaction with a user. I/O controller 740 may operate to manage hardware that is part of audio subsystem 720 and/or display subsystem 730. Additionally, I/O controller 740 illustrates a connection point for additional devices that connect to device 700 through which a user might interact with the system. For example, devices that may be attached to device 700 might include microphone devices, speaker or stereo systems, video systems or other display device, keyboard or keypad devices, or other I/O devices for use with specific applications such as card readers or other devices.

As mentioned above, I/O controller 740 may interact with audio subsystem 720 and/or display subsystem 730. For example, input through a microphone or other audio device may provide input or commands for one or more applications or functions of device 700. Additionally, audio output may be provided instead of or in addition to display output. In another example, if display subsystem includes a touchscreen, the display device also acts as an input device, which may be at least partially managed by I/O controller 740. There may also be additional buttons or switches on device 700 to provide I/O functions managed by I/O controller 740.

In one embodiment, I/O controller 740 manages devices such as accelerometers, cameras, light sensors or other environmental sensors, gyroscopes, global positioning system (GPS), or other hardware that may be included in device 700. The input may be part of direct user interaction, as well as providing environmental input to the system to influence its operations (such as filtering for noise, adjusting displays for brightness detection, applying a flash for a camera, or other features).

In one embodiment, device 700 includes power management 750 that manages battery power usage, charging of the battery, and features related to power saving operation. Memory subsystem 760 may include memory device(s) 762 for storing information in device 700. Memory subsystem 760 may include nonvolatile (state does not change if power to the memory device is interrupted) and/or volatile (state is indeterminate if power to the memory device is interrupted) memory devices. Memory 760 may store application data, user data, music, photos, documents, or other data, as well as system data (whether long-term or temporary) related to the execution of the applications and functions of system 700.

In one embodiment, memory subsystem 760 includes memory controller 764 (which could also be considered part of the control of system 700, and could potentially be considered part of processor 710). Memory controller 764 monitors performance of memory 762. For example, memory controller 764 may issue a command for memory 762 to access data—e.g., on behalf of processor 710.

Connectivity 770 may include hardware devices (e.g., wireless and/or wired connectors and communication hardware) and software components (e.g., drivers, protocol stacks) to enable device 700 to communicate with external devices. The device could be separate devices, such as other computing devices, wireless access points or base stations, as well as peripherals such as headsets, printers, or other devices.

Connectivity 770 may include multiple different types of connectivity. To generalize, device 700 is illustrated with cellular connectivity 772 and wireless connectivity 774. Cellular connectivity 772 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 774 refers to wireless connectivity that is not cellular, and may include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 780 include hardware interfaces and connectors, as well as software components (e.g., drivers, protocol stacks) to make peripheral connections. It will be understood that device 700 could both be a peripheral device ("to" 782) to other computing devices, as well as have peripheral devices ("from" 784) connected to it. Device 700 commonly has a "docking" connector to connect to other computing devices for purposes such as managing (e.g., downloading and/or uploading, changing, synchronizing) content on device 700. Additionally, a docking connector may allow device 700 to connect to certain peripherals that allow device 700 to control content output, for example, to audiovisual or other systems.

In addition to a proprietary docking connector or other proprietary connection hardware, device 700 may make peripheral connections 780 via common or standards-based connectors. Common types may include a Universal Serial Bus (USB) connector (which may include any of a number of different hardware interfaces), DisplayPort including MiniDisplayPort (MDP), High Definition Multimedia Interface (HDMI), Firewire, or other type.

In one implementation, a device comprises protocol logic comprising circuitry to determine a communication protocol, and signaling logic comprising circuitry to operate a first physical layer (PHY) according to the communication protocol. In response to the signaling logic, the first PHY is to communicate with a second PHY an indication of a first transition from a first power state by one of the first PHY and the second PHY, a plurality of packets each including a respective format identified by a camera serial interface standard. According to the camera serial interface standard, an exit from the first power state followed by a start of transmission sequence indicates a start of a packet, and an end of transmission sequence followed by a transition to the first power state indicates an end of a packet. In response to the signaling logic, the first PHY is to further communicate with the second PHY a packet delimiter sequence, wherein the plurality of packets and the packet delimiter sequence are to be communicated after the first transition and prior to any other transition to the first power state, subsequent to the first transition, by the one of the first PHY and the second PHY.

In an embodiment, the camera serial interface standard includes a standard defined in a MIPI CSI-2 specification. In another embodiment, the first PHY and the second PHY are compatible with a MIPI differential PHY (D-PHY) standard. In another embodiment, the first PHY and the second PHY are compatible with a MIPI camera PHY (C-PHY) standard. In another embodiment, the device is to operate the first PHY to receive the plurality of packets from the second PHY. In another embodiment, the one of the first PHY and the second PHY includes the first PHY. In another embodiment, the packet delimiter sequence includes a concatenation of an end of transmission sequence, a preamble sequence and a synchronization sequence, wherein one or more of the end of transmission sequence, the preamble sequence and the synchronization sequence is identified by a MIPI PHY standard. In another embodiment, the packet delimiter sequence includes a concatenation of an end of transmission bit sequence and a start of transmission bit sequence, wherein one or both of the end of transmission bit sequence and the start of transmission bit sequence is identified by a MIPI PHY standard.

In another implementation, a method comprises operating a first physical layer (PHY) to communicate with a second PHY an indication of a first transition from a first power state by one of the first PHY and the second PHY, and a plurality of packets each including a respective format identified by a camera serial interface standard. According to the camera serial interface standard, an exit from the first power state followed by a start of transmission sequence indicates a start of a packet, and an end of transmission sequence followed by a transition to the first power state indicates an end of a packet. The operating is further to communicate with the second PHY a packet delimiter sequence, wherein the plurality of packets and the packet delimiter sequence are communicated after the first transition and prior to any other transition to the first power state, subsequent to the first transition, by the one of the first PHY and the second PHY.

In an embodiment, the camera serial interface standard includes a standard defined in a MIPI CSI-2 specification. In another embodiment, the first PHY and the second PHY are compatible with a MIPI differential PHY (D-PHY) standard. In another embodiment, the first PHY and the second PHY are compatible with a MIPI camera PHY (C-PHY) standard. In another embodiment, operating the first PHY to communicate the plurality of packets includes operating the first PHY to receive the plurality of packets from the second PHY. In another embodiment, the one of the first PHY and the second PHY includes the first PHY. In another embodiment, the packet delimiter sequence includes a concatenation of an end of transmission sequence, a preamble sequence and a synchronization sequence, wherein one or more of the end of transmission sequence, the preamble sequence and the synchronization sequence is identified by a MIPI PHY standard. In another embodiment, the packet delimiter sequence includes a concatenation of an end of transmission bit sequence and a start of transmission bit sequence, wherein one or both of the end of transmission bit sequence and the start of transmission bit sequence is identified by a MIPI PHY standard.

In another implementation, a non-transitory computer-readable storage medium having stored thereon instructions which, when executed by one or more processing units, cause the one or more processing units to perform a method comprising operating a first physical layer (PHY) to communicate with a second PHY an indication of a first transition from a first power state by one of the first PHY and the second PHY, and a plurality of packets each including a respective format identified by a camera serial interface standard. According to the camera serial interface standard an exit from the first power state followed by a start of transmission sequence indicates a start of a packet, and an end of transmission sequence followed by a transition to the first power state indicates an end of a packet. The operating is to further communicate with the second PHY a packet delimiter sequence, wherein the plurality of packets and the packet delimiter sequence are communicated after the first transition and prior to any other transition to the first power state, subsequent to the first transition, by the one of the first PHY and the second PHY.

In an embodiment, the camera serial interface standard includes a standard defined in a MIPI CSI-2 specification. In another embodiment, the first PHY and the second PHY are compatible with a MIPI differential PHY (D-PHY) standard. In another embodiment, the first PHY and the second PHY are compatible with a MIPI camera PHY (C-PHY) standard. In another embodiment, operating the first PHY to communicate the plurality of packets includes operating the first PHY to receive the plurality of packets from the second PHY. In another embodiment, the one of the first PHY and the second PHY includes the first PHY. In another embodiment, the packet delimiter sequence includes a concatenation of an end of transmission sequence, a preamble sequence and a synchronization sequence, wherein one or more of the end of transmission sequence, the preamble sequence and the synchronization sequence is identified by a MIPI PHY standard. In another embodiment, the packet delimiter sequence includes a concatenation of an end of transmission bit sequence and a start of transmission bit sequence, wherein one or both of the end of transmission bit sequence and the start of transmission bit sequence is identified by a MIPI PHY standard.

In another implementation, a system comprises a first communication device including a first PHY, the first communication device including protocol logic comprising circuitry to determine a communication protocol, and signaling logic comprising circuitry to operate a first physical layer (PHY) according to the communication protocol. In response to the signaling logic, the first PHY is to communicate with a second PHY an indication of a first transition from a first power state by one of the first PHY and the second PHY, and a plurality of packets each including a respective format identified by a camera serial interface standard, wherein, according to the camera serial interface standard, an exit from the first power state followed by a start of transmission sequence indicates a start of a packet, and an end of transmission sequence followed by a transition to the first power state indicates an end of a packet. The first PHY is to further communicate with the second PHY a packet delimiter sequence, wherein the plurality of packets and the packet delimiter sequence are to be communicated after the first transition and prior to any other transition to the first power state, subsequent to the first transition, by the one of the first PHY and the second PHY. The system further comprises a second device including the second PHY, and an interconnect coupled between the first PHY and the second PHY.

In another embodiment, the camera serial interface standard includes a standard defined in a MIPI CSI-2 specification. In another embodiment, the first PHY and the second PHY are compatible with a MIPI differential PHY (D-PHY) standard. In another embodiment, the first PHY and the second PHY are compatible with a MIPI camera PHY (C-PHY) standard. In another embodiment, the first communication device is to operate the first PHY to receive the plurality of packets from the second PHY. In another embodiment, the one of the first PHY and the second PHY includes the first PHY. In another embodiment, the packet delimiter sequence includes a concatenation of an end of transmission sequence, a preamble sequence and a synchronization sequence, wherein one or more of the end of transmission sequence, the preamble sequence and the synchronization sequence is identified by a MIPI PHY standard. In another embodiment, the packet delimiter sequence includes a concatenation of an end of transmission bit sequence and a start of transmission bit sequence, wherein one or both of the end of transmission bit sequence and the start of transmission bit sequence is identified by a MIPI PHY standard.

Techniques and architectures for communicating information such as image data via an interconnect are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense.

What is claimed is:

1. A device comprising:
   protocol logic comprising circuitry to determine a communication protocol;
   signaling logic comprising circuitry to operate a first physical layer (PHY) according to the communication protocol, wherein in response to the signaling logic, the first PHY to communicate with a second PHY:
   an indication of a first transition from a first power state by one of the first PHY and the second PHY;
   a plurality of packets each including a respective format identified by a camera serial interface standard, wherein, according to the camera serial interface standard, an exit from the first power state followed by a start of transmission sequence indicates a start of a packet, and an end of transmission sequence followed by a transition to the first power state indicates an end of a packet; and
   a packet delimiter sequence that differs from a conventional protocol and shortens an overall duration of a packet delimiter as compared to the conventional protocol, wherein the plurality of packets and the packet delimiter sequence are to be communicated after the first transition and prior to any other transition to the first power state, subsequent to the first transition, by the one of the first PHY and the second PHY, wherein the packet delimiter sequence includes a concatenation of an end of transmission sequence, a preamble sequence and a synchronization sequence, and one or more of the end of transmission sequence, the preamble sequence and the synchronization sequence is identified by a MIPI (Mobile Industry Processor Interface) PHY standard, or the packet delimiter sequence includes a concatenation of an end of transmission bit sequence and a start of transmission bit sequence, and one or both of the end of transmission bit sequence and the start of transmission bit sequence is identified by the MIPI PHY standard.

2. The device of claim 1, wherein the camera serial interface standard includes a standard defined in a MIPI CSI-2 specification.

3. The device of claim 1, wherein the first PHY and the second PHY are compatible with a MIPI differential PHY (D-PHY) standard.

4. The device of claim 1, wherein the first PHY and the second PHY are compatible with a MIPI camera PHY (C-PHY) standard.

5. The device of claim 1, wherein the device is to operate the first PHY to receive the plurality of packets from the second PHY.

6. The device of claim 1, wherein the one of the first PHY and the second PHY includes the first PHY.

7. A method comprising:
   operating a first physical layer (PHY) to communicate with a second PHY:
   an indication of a first transition from a first power state by one of the first PHY and the second PHY;
   a plurality of packets each including a respective format identified by a camera serial interface standard, wherein, according to the camera serial interface standard: an exit from the first power state followed by a start of transmission sequence indicates a start of a packet, and
   an end of transmission sequence followed by a transition to the first power state indicates an end of a packet; and
   a packet delimiter sequence that differs from a conventional protocol and shortens an overall duration of a packet delimiter as compared to the conventional protocol, wherein the plurality of packets and the packet delimiter sequence are communicated after the first transition and prior to any other transition to the first power state, subsequent to the first transition, by the one of the first PHY and the second PHY, wherein the packet delimiter sequence includes a concatenation of an end of transmission sequence, a preamble sequence and a synchronization sequence, and one or more of the end of transmission sequence, the preamble sequence and the synchronization sequence is identified by a MIPI (Mobile Industry Processor Interface) PHY standard, or the packet delimiter sequence includes a concatenation of an end of transmission bit sequence and a start of transmission bit sequence, and one or both of the end of transmission bit sequence and the start of transmission bit sequence is identified by the MIPI PHY standard.

8. The method of claim 7, wherein the camera serial interface standard includes a standard defined in a MIPI CSI-2 specification.

9. The method of claim 7, wherein the first PHY and the second PHY are compatible with a MIPI differential PHY (D-PHY) standard.

10. A non-transitory computer-readable storage medium having stored thereon instructions which, when executed by one or more processing units, cause the one or more processing units to perform a method comprising:
operating a first physical layer (PHY) to communicate with a second PHY:
an indication of a first transition from a first power state by one of the first PHY and the second PHY;
a plurality of packets each including a respective format identified by a camera serial interface standard, wherein, according to the camera serial interface standard: an exit from the first power state followed by a start of transmission sequence indicates a start of a packet, and an end of transmission sequence followed by a transition to the first power state indicates an end of a packet; and
a packet delimiter sequence that differs from a conventional protocol and shortens an overall duration of a packet delimiter as compared to the conventional protocol, wherein the plurality of packets and the packet delimiter sequence are communicated after the first transition and prior to any other transition to the first power state, subsequent to the first transition, by the one of the first PHY and the second PHY, wherein the packet delimiter sequence includes a concatenation of an end of transmission sequence, a preamble sequence and a synchronization sequence, and one or more of the end of transmission sequence, the preamble sequence and the synchronization sequence is identified by a MIPI (Mobile Industry Processor Interface) PHY standard, or the packet delimiter sequence includes a concatenation of an end of transmission bit sequence and a start of transmission bit sequence, and one or both of the end of transmission bit sequence and the start of transmission bit sequence is identified by the MIPI PHY standard.

11. The computer-readable storage medium of claim 10, wherein the first PHY and the second PHY are compatible with a MIPI camera PHY (C-PHY) standard.

12. A system comprising:
a first communication device including a first PHY, the first communication device including:
protocol logic comprising circuitry to determine a communication protocol;
signaling logic comprising circuitry to operate a first physical layer (PHY) according to the communication protocol, wherein in response to the signaling logic, the first PHY to communicate with a second PHY:
an indication of a first transition from a first power state by one of the first PHY and the second PHY;
a plurality of packets each including a respective format identified by a camera serial interface standard, wherein, according to the camera serial interface standard, an exit from the first power state followed by a start of transmission sequence indicates a start of a packet, and an end of transmission sequence followed by a transition to the first power state indicates an end of a packet; and
a packet delimiter sequence that differs from a conventional protocol and shortens an overall duration of a packet delimiter as compared to the conventional protocol, wherein the plurality of packets and the packet delimiter sequence are to be communicated after the first transition and prior to any other transition to the first power state, subsequent to the first transition, by the one of the first PHY and the second PHY, wherein the packet delimiter sequence includes a concatenation of an end of transmission sequence, a preamble sequence and a synchronization sequence, and one or more of the end of transmission sequence, the preamble sequence and the synchronization sequence is identified by a MIPI (Mobile Industry Processor Interface) PHY standard, or the packet delimiter sequence includes a concatenation of an end of transmission bit sequence and a start of transmission bit sequence, and one or both of the end of transmission bit sequence and the start of transmission bit sequence is identified by the MIPI PHY standard;
a second device including the second PHY; and
an interconnect coupled between the first PHY and the second PHY.

13. The system of claim 12, wherein the camera serial interface standard includes a standard defined in a MIPI CSI-2 specification.

14. The system of claim 12, wherein the first PHY and the second PHY are compatible with a MIPI differential PHY (D-PHY) standard.

15. The system of claim 12, wherein the first PHY and the second PHY are compatible with a MIPI camera PHY (C-PHY) standard.

* * * * *